United States Patent [19]

Perazzoli, Jr.

[11] Patent Number: 5,101,485
[45] Date of Patent: Mar. 31, 1992

[54] VIRTUAL MEMORY PAGE TABLE PAGING APPARATUS AND METHOD

[75] Inventor: Frank L. Perazzoli, Jr., Redmond, Wash.

[73] Assignee: Digital Equipment Corporation, Maynard, Mass.

[21] Appl. No.: 373,873

[22] Filed: Jun. 29, 1989
(Under 37 CFR 1.47)

[51] Int. Cl.⁵ .............. G06F 12/00; G06F 13/00; G06F 9/00
[52] U.S. Cl. .................. 395/400; 395/425; 395/650; 364/DIG. 1
[58] Field of Search ... 364/200 MS File, 900 MS File

[56] References Cited

U.S. PATENT DOCUMENTS

| | | | |
|---|---|---|---|
| 4,356,549 | 10/1982 | Chuech | 364/200 |
| 4,680,700 | 7/1987 | Hester et al. | 364/200 |
| 4,718,008 | 1/1988 | Chang et al. | 364/300 |
| 4,730,249 | 3/1988 | O'Quin, II et al. | 364/200 |
| 4,742,447 | 5/1988 | Duvall et al. | 364/200 |
| 4,758,944 | 7/1988 | Bartley et al. | 364/200 |
| 4,758,946 | 7/1988 | Shar et al. | 364/200 |
| 4,761,737 | 8/1988 | Duvall et al. | 364/200 |
| 4,774,659 | 8/1988 | Smith et al. | 364/200 |
| 4,814,971 | 3/1989 | Thatte | 364/200 |

Primary Examiner—Joseph A. Popek
Assistant Examiner—Michael A. Whitfield
Attorney, Agent, or Firm—Flehr, Hohbach, Test, Albritton & Herbert

[57] ABSTRACT

A virtual memory nmanagement system and method in which the mechanism for selecting the pages to be swapped out of a process's working set takes into account special criteria for swapping out page table pages. When all the virtual memory pages referenced by a page table page are invalid, but some remain stored in primary memory, the page table page becomes eligible for removal from the process's working set. A page table page is made eligible for being swapped out to secondary memory only when every virtual memory page referenced by that page table page is invalid and no longer stored in primary memory.

13 Claims, 5 Drawing Sheets

VIRTUAL MEMORY PAGE TABLE PAGING APPARATUS AND METHOD

This application is related to the application entitled HEURISTIC IN-PAGE READ CLUSTERING APPARATUS AND METHOD, in the name of Frank Louis Perazzoli, Jr., Ser. No. 373,874, filed on the same date as this application, which is hereby incorporated by reference.

BACKGROUND OF THE INVENTION

1. Field of the Invention

The present invention relates to the management of page table pages by the virtual memory management system of a multitasking computer system. More specifically, the present invention relates to removing page table pages from the working set of a process and swapping such page table pages out of primary memory when certain conditions exist.

2. Summary of the Prior Art

Referring to FIG. 1, a computer system 10 is illustrated. The computer system is comprised of a central processing unit (hereinafter "CPU") 20, a plurality of processes 22-30 and primary memory 32, secondary memory 34 and a memory manager 36. Directly connected to the CPU 20 is the primary memory 32. The primary memory 32 is a high speed random access memory. It facilitates CPU processing by permitting fast memory access times. Secondary memory, on the other hand, is usually a large, relatively slow memory device. For example, optical and magnetic disc drives are frequently used as secondary memory. Secondary memory is generally characterized by a slow access time and being relatively inexpensive, compared to primary memory.

In the computer system 10, secondary memory 34 is much larger than primary memory 32. Each process 22-30 performs operations using primary memory 32 which is the only memory that a process "sees." Additional memory is located in the secondary memory and when that information is needed it is transferred into primary memory for the requesting process to access. Since primary memory is small, relative to secondary memory, information is constantly swapped in and out of primary memory. The device which controls the transfer of data between primary and secondary memory is called a virtual memory manager 36 (hereinafter sometimes called "memory manager"). The memory manager 36 utilizes a virtual memory scheme.

Many virtual memory schemes are used in the prior art. An example of one is now illustrated. In FIG. 1, a computer system 10 concurrently runs several processes 22-30 using the CPU 20. Each of these processes 22-30 is allocated a certain portion of primary memory 32. More specifically, each process has a virtual memory space which may far exceed the amount of primary memory that is assigned to it. The portion of each virtual memory space which is currently stored in primary memory is denoted in a "working set" list 22a-30a which is maintained for each process. Thus each process has a "working set," and all other data for the process is stored in secondary memory 34.

The virtual memory manager 36 controls which portions of each process's virtual memory space is to be stored in primary memory and dynamically changes the allocation of primary memory as required.

Referring to FIG. 2, in a virtual memory system, both physical and virtual memory spaces are divided into equally sized "pages."0 The memory manager 36 keeps track of the pages for each process running in the computer 10 by using a table called a "page table" 38. The page table 38 for any one process 22 contains many "page table entries" in (PTEs) 42, each of which denotes the location and status of one page in the process's virtual memory space.

Since a process typically uses many pages of memory there will be a corresponding number of PTEs 42. These PTEs are stored in an array (i.e., table) which itself occupies multiple pages of memory. For example, a process might use four thousand pages of memory and the four thousand PTEs might occupy four pages. Each page used to store PTEs is called a "page table page" 40 (hereinafter "PTP").

When a process has a very large virtual memory space, it may have several PTPs which are rarely or never used. Therefore, it is inefficient to keep these PTPs in primary memory 32. In addition, due to constraints on the size of the working set for a process, it is desirable to remove certain PTPs from a process's working set even before it is appropriate to swap the PTP out to secondary memory 34.

OBJECT AND SUMMARY OF THE INVENTION

It is an object of the present invention to provide a virtual memory scheme that more efficiently utilizes primary memory space by removing certain selected page table pages from the working set of an associated process before swapping such page table pages to secondary memory.

In summary, the present invention is a virtual memory management system and method in which the mechanism for selecting the pages to be removed from a process's working set takes into account special criteria for swapping out page table pages in two stages. In the first stage, when all the virtual memory pages referenced by a page table page are invalid, but some remain stored in primary memory, the page table page becomes eligible for removal from the process's working set. In the second stage, a page table page is made eligible for being swapped out to secondary memory when every virtual memory page referenced by that page table page is invalid and no longer stored in primary memory.

The attainment of the foregoing and related objects, advantages and features of the invention should be more readily apparent to those skilled in the art, after review of the following more detailed description of the invention, taken together with the drawings, in which:

DETAILED DESCRIPTION OF THE PREFERRED EMBODIMENT

Figure 1:
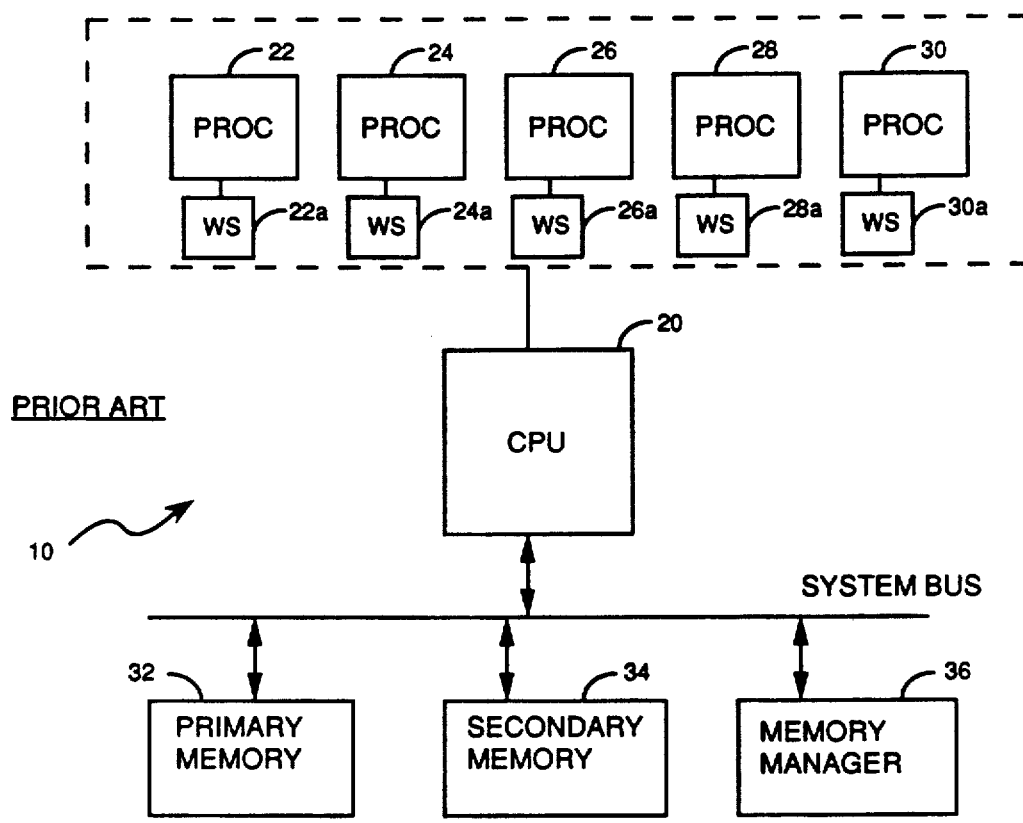
FIG. 1 is a block diagram of a computer system with a virtual memory management subsystem.
Figure 3:
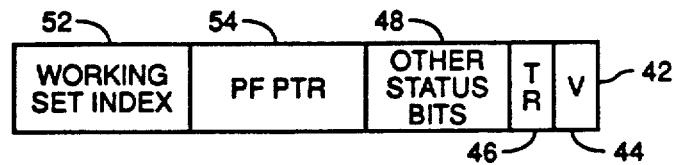
FIG. 3 illustrates a data structure for a page table entry of the preferred embodiment.

Referring to FIG. 3, a data structure for a page table entry (PTE) 42 is illustrated. As indicated in the preceding discussion, the PTE 42 indicates status and location for a page of data. Every page in the virtual memory space of a process has a PTE 42, regardless of the contents of the page. For every process (22-30 of FIG. 1) there is a page table 38. The page table 38 for a particular process contains PTEs for all the pages of memory that are used by that process. From the perspective of the process, the page table is a continuous list. In actuality, the page table may have a plurality of levels.

The PTE data structure 42 has a plurality of fields 44, 46, 48, 52 and 54. The state of these individual fields determines the overall status of the PTE 42. It is important to note that status of a PTE 42 and the status of the corresponding page are one and the same. Thus, when a PTE is said to have a status of "X," it is actually the corresponding virtual memory page which has that status. The valid "V" field 44 in the PTE is a binary value which indicates when a PTE 42 is valid. A valid PTE corresponds to a page that is in the working set. Conversely, invalid PTEs are not in the working set. There are several distinct invalid states as discussed below.

The transition "TR" field 46 is a binary value which indicates whether the PTE 42 is "in transition." A PTE 42 is in transition if it is in primary memory 32, but not in the working set. Conversely, a page that is not in transition is either "valid" or in secondary memory 34.

Space 48 is allotted in the PTE 42 for other status bits. Some of these status bits work in conjunction with the invalid designation. In secondary memory a page may be in an image or a paging file. An image file is any data or program file which can be retained after the process terminates. A paging file, on the other hand, represents a compilation of temporary data.

Another invalid state which may be designated by a PTE 42 is the "invalid and demand zero" state. When a particular process requires an additional page of memory, (not specific data from secondary memory, but one that it can use), a page of zeroes is created and moved into the working set. When the page of zeroes is added to the process' working set, the PTE becomes valid.

Another state that a PTE 42 may have is "inaccessible." A PTE with an "inaccessible" status corresponds to a portion of virtual memory that is undefined and unusable.

The PTE 42 also contains a working set index 52. The working set index 52 points to the "slot" in the working set list 22a occupied by the corresponding page. The index 52 is zero when the page is not in the working set. PTEs additionally contain a page frame pointer 54 (hereinafter "PFP"). The PFP 54 points to the physical location of the page which the PTE references. When a page is valid, the PFP 54 points to a page in primary memory 32. When a page is in the paging or an image file, the PFP 54 points to a page in the secondary memory 34.

Figure 4:
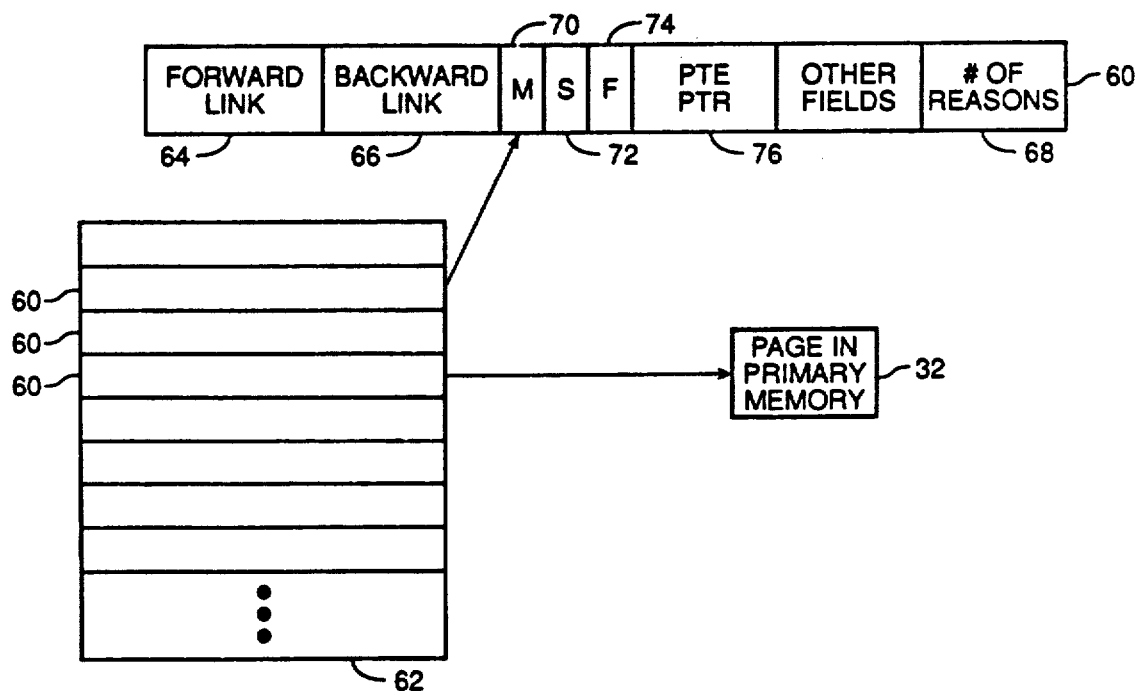
FIG. 4 illustrates a data structure of a page frame record of the preferred embodiment.

Referring to FIG. 4, a page frame record (hereinafter "PFR") 60 and a PFR database 62 are shown. A PFR 60 exists for every page in primary memory 32. All of the PFRs 60 are contained in a PFR database 62 which is an array of records 60 in primary memory 32. Each PFR 60 contains a forward link 64 and a backward link 66 which can be used to put the corresponding page on one of several doubly linked lists, which will be described below.

Figure 2:
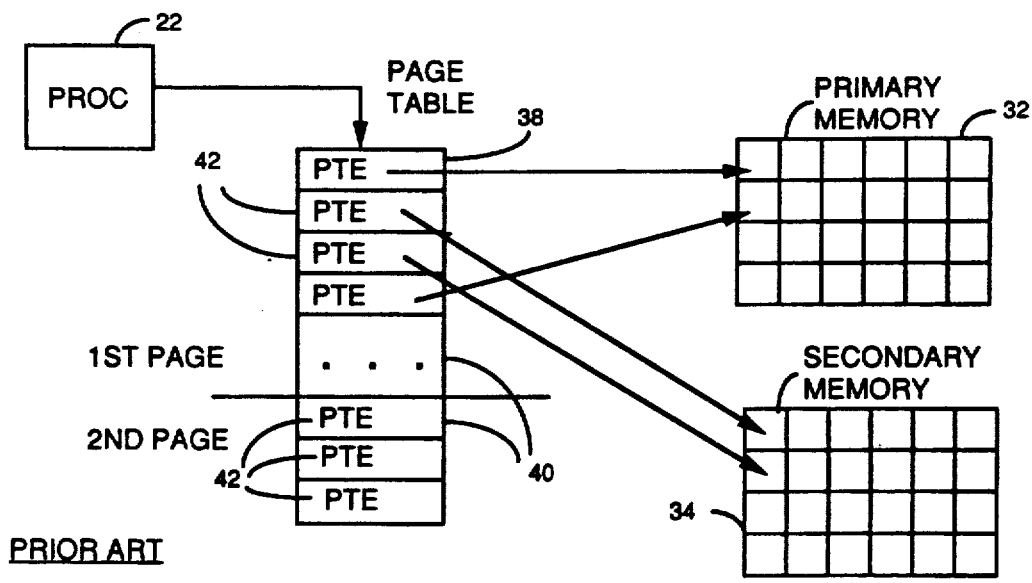
FIG. 2 is a prior art block diagram which illustrates one aspect of the memory mapping structure for the virtual memory space of one process.

Another field in the PFR 60 is called the "number of reasons to keep a page table page in primary memory" (hereinafter "number of reasons") 68. For PTPs, the number of reasons 68 is equal to the number of PTEs in the PTP (40 of FIG. 2) that are in the valid state or "in transition" state. When the number of reasons 68 is zero for a PTP 40, the PTP 40 may be moved out of primary memory 32 and into secondary memory 34. A more detailed explanation of the number of reasons 68 is provided below.

The PFR 60 also contains other fields. Some of these fields indicate whether the page to which the PFR 60 points is on the modified, standby or free list, etc. These lists are described in detail below with reference to FIG. 5. The "M" field 70 indicates whether the page to which a PFR 60 points is on the modified list. The "S" field 72 indicates whether the page to which a PFR points is on the standby list. The "F" field 74 denotes whether the page to which the PFR 60 points is on the free list (described below).

The PTE pointer 76 points to the PTE, if any, which corresponds to the same page in primary memory as this PFR 60. Note that every page in the working set of a process has both a PTE 42 and a PFR 60 which denote different aspects of the status of that page.

Figure 5:
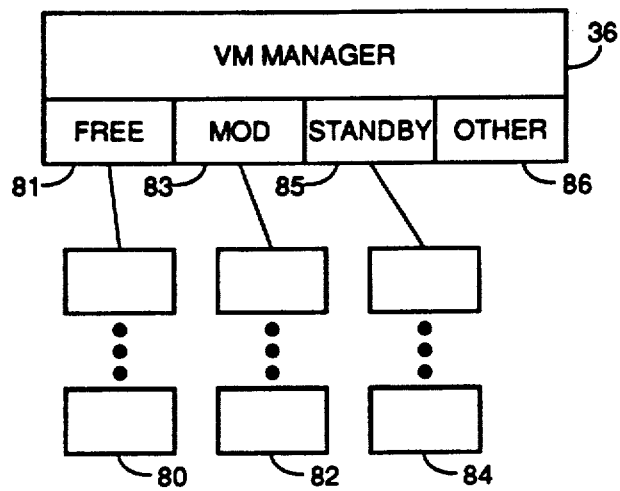
FIG. 5 is a block diagram of a plurality of memory managing lists of the preferred embodiment.

Referring to FIG. 5, a plurality of lists and their relation to the virtual memory manager 36 are illustrated. In primary memory 32, each process has a number of pages that are used by its particular working set. An additional portion of primary memory contains lists that are used by the virtual memory manager 36. More specifically, the memory manager 36 tries to maintain a set of free pages which can be allocated to the various processes when new pages are read in from secondary memory. The memory manager maintains a free list 80, a modified list 82, and a standby list 84, as well as several other lists. Each list is a doubly linked list of pages in the primary memory 32.

The free list 80 is a doubly linked list of physical memory pages that are available for use in the primary memory 32 by any process 22-30. Pages are added to a tail of the list 80 and always removed from a head. A page may be placed on the free list 80 when its number of reasons 68 in its PFR 60 becomes zero (i.e., the number of reasons to keep it in primary memory is zero). Associated with the free list 80 is a list head 81 that contains pointers to the first and last pages on the list 80, and a count of the number of pages in the list 80.

The modified list 82 is a doubly linked list of physical memory pages that need to have their contents written back to secondary memory before reuse. A page is placed in the modified list 82 when it is removed from the working set of a process and the modify bit 70 of its PFR 60 is set. When the modify bit 70 is set, it indicates that the page it points to has been altered since it was last read into primary memory 32 (e.g., from an image file) or since the page was first created if the page did not previously exist.

Associated with the modified list 82 is a list head 83 that points to the first and last pages on the list 82, and a count of the number of pages in the list 82. Memory management 36 also maintains a high and low limit count for the modified page list 82. When the number of pages on the modified list 82 exceeds the high limit, some of the modified pages are written to secondary memory 34.

The standby list 84 is a doubly linked list of physical memory pages that are available for re-use. Pages are normally added to a tail and removed from a head of the list 84. When a fault occurs on a page on the standby list 84 (discussed below), the page is removed from the standby list 84 regardless of its position in the list. A valid page is placed on the standby list 84 when its reference count in the PFR 60 becomes zero and the modified "M" field 70 of the PFR is clear. A non-set "M" field 70 indicates the page has not been written into (it has not been modified). Associated with the standby list 84 is a list head 85 that points to the first and last pages on the list 84 and a count of the number of pages in the list 84.

The other lists 86 include a zeroed page list which provides zero pages to the free list 80, and a bad page list which links together all the pages of memory that are considered unusable due to memory parity errors.

Figure 6:
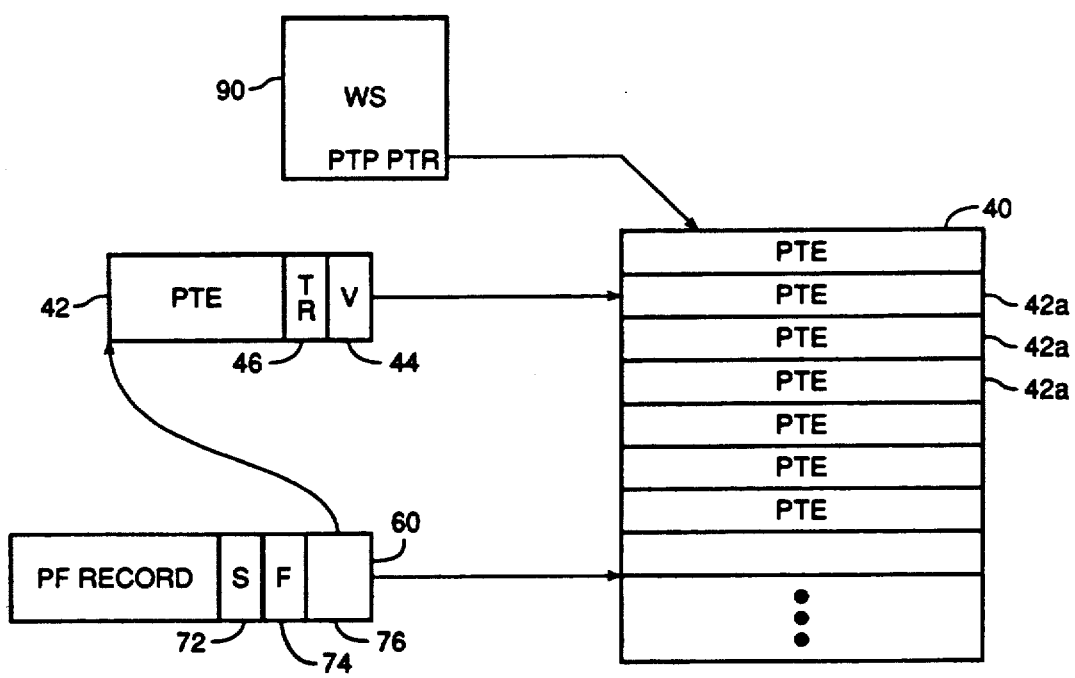
FIG. 6 is a block diagram which illustrates the memory mapping aspects of primary memory with respect to paging page table pages in the preferred embodiment.

Referring to FIG. 6, the data structures and lists mentioned above play an integral role in the paging of PTPs 40. The working set list 90 for a particular process contains pointers to all the valid pages for that process, including the PTPs for the process. A PTP 40 in primary memory 32 has a plurality of identifiers. Since it is a page it has a PTE 42. Since it is in primary memory it has a PFR 60.

When the PTP 40 is in the working set, its PTE 42 has the following conditions. The valid bit 44 is set and its in transition bit 46 is not set. Turning now to its PFR 60, if the page (PTP) 40 is in the working set, then the free list and standby list fields 72–74 are not set. There is a value, however, in the number of reasons field (68 of FIG. 4).

The number of reasons 68, as mentioned above, involves two parameters: the number of PTEs 42a in the valid state and the number of PTEs 42a in the transition state. When there is at least one PTE 42a in a PTP 40 that is valid, the number of reasons 68 is set to the number of PTEs 42a in the valid state plus one (number of valid PTEs + 1). Therefore, when the number of reasons 68 equals one, the memory manager (36 of FIG. 1), which monitors the number of reasons 68, knows that there are no more valid PTEs 42a left in the PTP 40.

When this occurs, the memory manager scans the PTP 40 for the number of PTEs 42a that are in transition. The previous definition of number of reasons (number of valid PTEs + 1) is discarded and replaced with a new definition. The new definition for the number of reasons 68 is the number of PTEs 42a in the transition state. Additionally, the PTP 40 is now eligible for being removed from the working set. If the working set list 22a is full (i.e., contains a predefined maximum number of pages), the memory manager changes the PTE 42 which references the PTP 40 to the transition state. This is accomplished by clearing the valid bit 44 and setting the transition bit 46. The PTP 40 is then removed from the working set list 90 for that process.

It should be noted that when there are no valid PTEs left in a PTP 40, none of the virtual memory pages corresponding to the PTP are in the working set of the process. Thus an equivalent criteria for making a PTP 40 eligible for removal from the working set is as follows: a PTP is eligible for removal from the working set when none of the PTEs in the PTP correspond to virtual memory pages in the working set.

Note that the PTE pointer 76 in each PFR 60 provides direct physical addressing to the PTE 42 for the PTP 40. The memory manager 36 uses direct physical addressing for updating PTEs 42a in the PTP 40. The reason for direct physical addressing is to avoid a page fault when accessing this PTP 40 which is officially invalid, but in fact directly accessible in primary memory 32. While the PTP 40 is in transition it will be necessary to update PTEs 42a in the PTP. The mechanism for updating PTEs in a PTP 40 which is invalid and in transition is described below.

Figure 7:
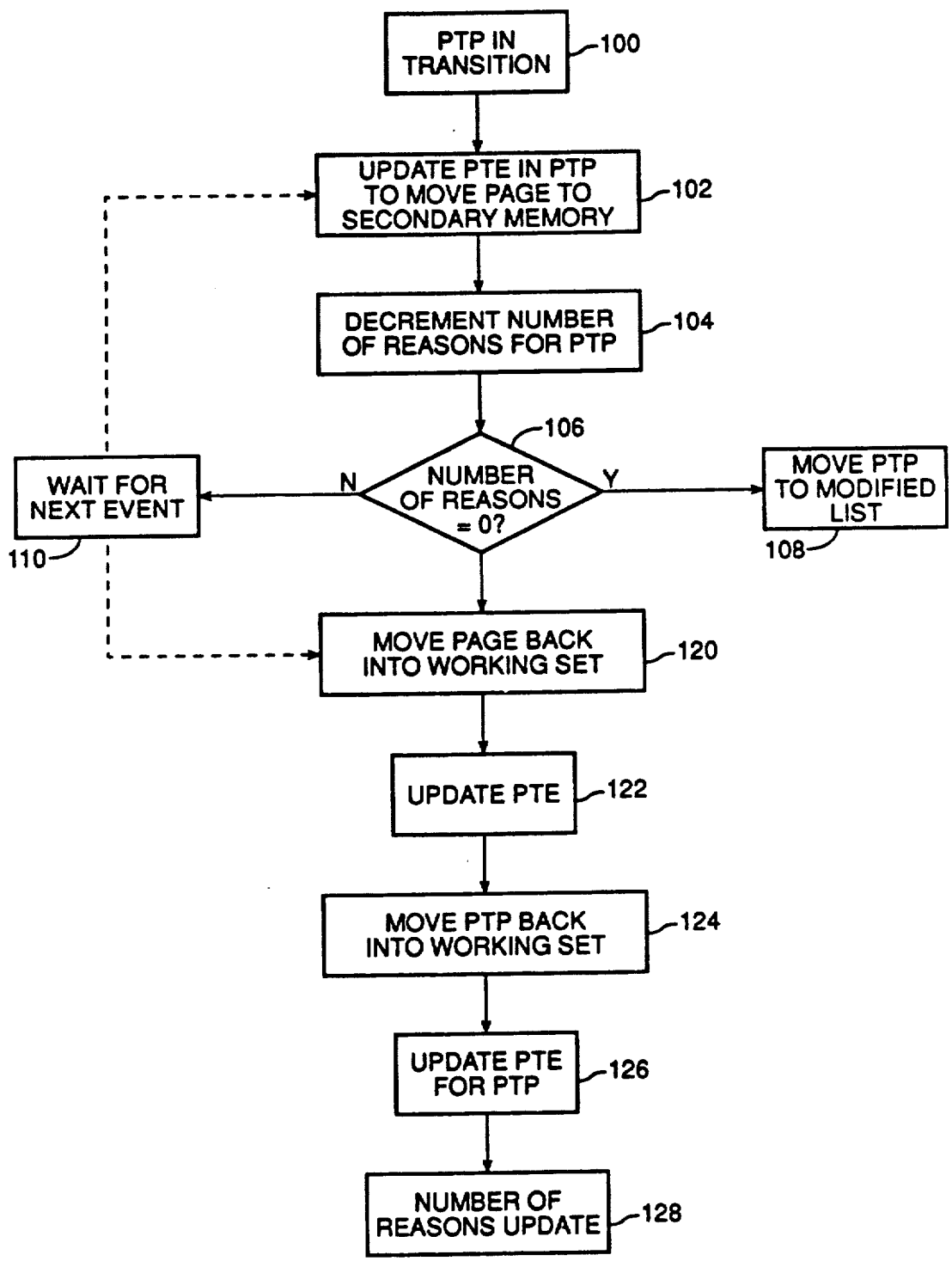
FIG. 7 is a flowchart illustrating the procedure for paging a page table page.

Referring to FIG. 7, a flowchart is shown for updating PTEs 42a in the PTP 40 once it has been removed from the working set 90. In step 100 of the program a determination is made that the PTP 40 is removed (or made eligible for removal) from the working set 90 and in transition (via PTE 42). In step 102, an event occurs requiring the updating of a PTE 42a in the PTP 40. In this example, the PTE 42a is changed to "invalid and in the paging file" or "invalid and in the image file," and the page to which the PTE 42a points is moved to secondary memory 34. Once this occurs the PTE 42a is no longer in transition (i.e., it is "invalid and in the paging file" or "invalid and in the image file"). Therefore, in step 104 the number of reasons 68 is decremented by 1 (one).

In step 106, a determination is made as to whether the number of reasons 68 is zero, indicating that all the PTEs 42a have changed from in transition to some other invalid state. If the number of reasons 68 is zero, then (in step 108) the PTP 40 is moved to the modified list (82 of FIG. 5). From the modified list 82 the PTP 40 may be moved to secondary memory 34. Thus, when none of the virtual memory pages corresponding to the PTEs in a PTP are stored in primary memory, the PTP becomes eligible for being swapped out to secondary memory. If, in step 106, the number of reasons 68 is not zero then the program waits for another event to occur (step 110).

If a page referenced by a PTE 42a is moved back into the working set (step 120), its PTE 42a must be updated to "valid" (step 122). If a PTP 40 has a PTE 42a in the "valid" state, the PTP 40 must be moved back into the working set 90 (step 124). Next, in step 126, the PTE 42 which references the PTP 40 is updated to denote a valid state. In step 128, the number of reasons 68 in the PFR 60 is updated to the original definition wherein the number of reasons 68 equals the number of PTEs 42a in the valid state + 1. The updating for moving a PTP 40 from in transition back into the working set 90 is then complete.

Figure 8:
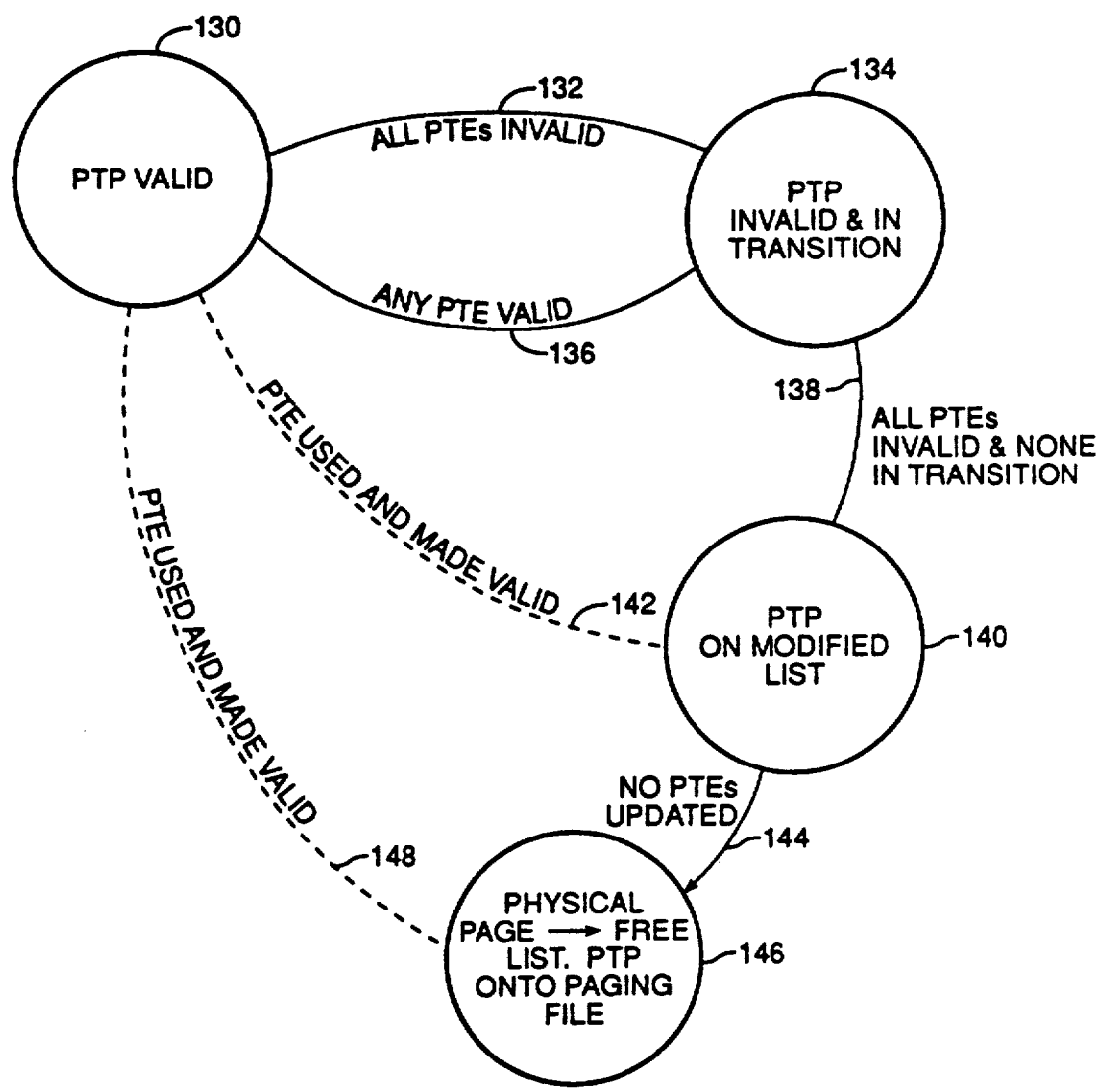
FIG. 8 is a state diagram of the various states and conditions of the preferred embodiment.

Referring to FIG. 8, a state diagram is shown which illustrates the various state involved in the paging of PTPs 40 out of the primary memory 32. Beginning in state 130, the PTP 40 is in the working set. Its PTE 42 indicates a valid state. If all the PTEs 42a in the PTP 40 become invalid (line 132) the PTP 40 moves to state 134. The PTE 42 for the PTP 40 state 134 denotes that the PTP is in transition. Thus, in that state 134, the PTP 40 is out of the working set, because no PTEs 42a are valid, and in transition. If any of the PTEs 42a become valid (line 136) the PTP 40 returns to state 130.

If, however, from state 134, all the PTEs 42a become invalid and not in transition (line 138) the PTP 40 moves to state 140. This happens when all the virtual memory pages represented by the PTP have been swapped out to secondary memory. At state 140, the PTP is on the modified list (82 of FIG. 5) pending movement to secondary memory 34. All of the PTEs 42a in the PTP 40 are in some invalid state other than "in transition." If, at this juncture, a page which a PTE 42a references is brought into the working set 90 (line 142), the PTP 40 is moved into the working set and the PTE 42a becomes valid (state 130). The PTE 42 which references the PTP 40 is also made valid.

If, however, from state 140, no PTEs 42a are updated (line 144) then the PTP 40 is written to secondary memory 34, state 146. The physical space held by the PTP 40 in primary memory 32 is turned over to the free list (80 of FIG. 5). As with state 140, if a page which a PTE 42a references is brought into the working set 90 (line 148), the PTP 40 is moved into the working set and the PTE 42a becomes valid (state 130). The PTE 42 which references the PTP 40 is also made valid.

It should further be apparent to those skilled in the art that various changes in form and details of the invention as shown and described may be made. It is intended that such changes be included within the spirit and scope of the claims appended hereto.

What is claimed is:

1. A virtual memory addressing means for a multitasking computer having a multiplicity of simultaneously active processes, the computer having primary and secondary physical memory for storing pages of memory associated with each of said active processes, each active process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for removing a page table page from said working set of said virtual memory pages when none of said page table entries in said page table page correspond to virtual memory pages in said working set of said virtual memory pages.

2. A virtual memory address means for a multitasking computer having a multiplicity of simultaneously active processes, the computer having primary and secondary physical memory for storing pages of memory associated with each of said processes, each process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for moving selected virtual memory pages of said active process to secondary physical memory and for removing selected pages from said working set of said virtual memory pages; said paging means denoting a page table page as being eligible for removal from said working set of said virtual memory pages when none of said page table entries in said page table page correspond to virtual memory pages in said working set.

3. The virtual memory addressing means set forth in claim 2, each said page table entry including status means for denoting whether the corresponding virtual memory page is eligible for being moved from said primary to said secondary physical memory;

said paging means including means for denoting in a page table entry corresponding to a page table page that said page table page is eligible for being moved from said primary to said secondary physical memory when none of said page table entries in said page table page correspond to virtual memory pages stored in primary physical memory.

4. A virtual memory address means for a multitasking computer having a multiplicity of simultaneously active processes, the computer having primary and secondary physical memory for storing pages of memory associated with each of said processes, each process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for removing a page table page from said working set of said virtual memory pages when none of said page table entries in said page table page correspond to virtual memory pages in said working set; said paging means including means for storing said page table page in secondary physical memory when none of said page table entries in said page table page correspond to virtual memory pages stored in primary physical memory.

5. The virtual memory addressing means set forth in claim 4,
- each said page table entry including status means for denoting said status value for the corresponding virtual memory page, wherein said status means is assigned a distinct "valid" status value for virtual memory pages stored in primary physical memory and included in said working set, a distinct "invalid" status value for virtual memory pages stored in secondary physical memory, and a distinct "transition" status value for virtual memory pages stored in primary physical memory but not included in said working set;
- said paging means including means for changing the status value denoted by a page table entry corresponding to a page table page to said "transition" status value when none of said page table entries in said page table page correspond to virtual memory pages in said working set.

6. A virtual memory management system for a multitasking computer having a multiplicity of simultaneously active processes, the computer having primary and secondary physical memory for storing pages of memory associated with each of said active processes, each active process having an associated set of virtual memory pages; said virtual memory management system comprising:
- page table means for each active process, each said page table means denoting a status value for each virtual memory page associated with a corresponding one of said active processes; each said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;
- working set means for each active process, each said working set means denoting a working set of said virtual memory pages which are stored in primary physical memory for a corresponding one of said active processes, each said working set of said virtual memory pages including at least one of said page table pages; and
- paging means, coupled to said page table means and said working set means for each active process, for removing a page table page from said working set of said virtual memory pages associated with one of said active processes when none of said page table entries in said page table page correspond to virtual memory pages in said working set; said paging means including means for storing said page table page in secondary physical memory when none of said page table entries in said page table page correspond to virtual memory pages stored in primary physical memory.

7. The virtual memory management system set forth in claim 6,
- each said page table entry including status means for denoting said status value for the corresponding virtual memory page, wherein said status means is assigned a distinct "valid" status value for virtual memory pages stored in primary physical memory and included in said working set of said virtual memory pages, a distinct "invlaid" status value for virtual memory pages stored in secondary physical memory, and a distinct "transition" status value for virtual memory pages stored in primary physical memory but not included in said working set of said virtual memory pages;
- said paging means including means for changing the status value denoted by a page table entry corresponding to a page table page to said "transition" status value when none of said page table entries in said page table page correspond to virtual memory pages in said working set.

8. A virtual memory management method for a multitasking computer having a multiplicity of simultaneously active processes, the computer having primary and secondary physical memory for storing pages of memory associated with each of said processes, each process having an associated set of virtual memory pages, the steps of the method comprising:
- providing a page table for each active process in said multitasking computer, each said page table denoting a status value for each virtual memory page associated with a corresponding one of said active processes; denoting in said page table a page table entry for each said virtual memory page specifying a physical address in said primary or secondary physical memory in accordance with where said virtual memory page is currently stored, said page table entries being stored in one or more page table pages;
- denoting, for each active process, a working set of said virtual memory pages which are stored in primary physical memory; said working set of said virtual memory pages including at least one of said page table pages; and
- removing a page table page from said working set of said virtual memory pages when none of said page table entries in said page table page correspond to virtual memory pages in said working set.

9. The virtual memory management method of claim 8, further including the step of storing said page table page in secondary physical memory when none of said page table entries in said page table page correspond to virtual memory pages stored in primary physical memory.

10. The virtual memory management method of claim 8,
- each said page table entry denoting said status value for a corresponding virtual memory page, wherein said status value is set to a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages;
- said method including changing the status value denoted by a page table entry corresponding to a page table page to said "transition" status value when none of said page table entries in said page table page correspond to virtual memory pages in said working set.

11. A virtual memory management method for a multitasking computer having a multiplicity of simultaneously active processes, the computer having primary and secondary physical memory for storing pages of memory associated with each of said processes, each process having an associated set of virtual memory pages, the steps of the method comprising:

provinding a page table for each active process in said multitasking computer, each said page table denoting a status value for each virtual memory page associated with a corresponding one of said active processes; denoting in said page table a page table entry for each said virtual memory page specifying a physical address in said primary or secondary physical memory in accordance with where said virtual memory page is currently stored, said page table entries being stored in one or more page table pages;

denoting, for each active process, a working set of said virtual memory pages which are stored in primary physical memory; said working set of said virtual memory pages including at least one of said page table pages;

moving selected virtual memory pages of each said active process to secondary physical memory and removing selected pages from said working set of said virtual memory pages associated with each said active process; and denoting a page table page as being eligible for removal from a corresponding one of said working sets of said virtual memory pages when one of said page table entries in said page table page correspond to virtual memory pages in said working set.

12. The virtual memory management method of claim 11, wherein:

each said page table entry denotes whether a corresponding virtual memory page is eligible for being moved from said primary to said secondary physical memory; and, said memory management method further includes the step of:

denoting in a page table entry corresponding to a page table page that said page table page is eligible for being moved from said primary to said secondary physical memory when none of said page table entries in said page table page correspond to virtual memory pages stored in primary physical memory.

13. The virtual memory management method of claim 11, wherein:

each said page table entry denotes said status value for a corresponding virtual memory page, wherein said status value is set to a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages; and, said memory management method further includes the step of changing the status value denoted by a page table entry corresponding to a page table page to said "transition" status value when none of said page table entries in said page table page correspond to virtual memory pages in said working set.

* * * * *

UNITED STATES PATENT AND TRADEMARK OFFICE
CERTIFICATE OF CORRECTION

PATENT NO. : B1 5,101,485
DATED : December 10, 1996
INVENTOR(S) : Frank L. Perazzoli, Jr.

It is certified that error appears in the above-identified patent and that said Letters Patent is hereby corrected as shown below:

Column 7,
Line 63, after "memory." delete the period and insert

--; wherein at least subset of page table pages removed from said working set by said paging means include at least one page table entry that specifies a physical address in said primary physical memory for a corresponding virtual memory page.--

Column 8,
Line 54, after "memory." delete the period and insert

--; wherein at least subset of page table pages removed from said working set by said paging means include at least one page table entry that specifies a physical address in said primary physical memory for a corresponding virtual memory page.--

Column 9,
Line 35, after "set." delete the period and insert

--; wherein at least subset of page table pages removed from said working set by said removing step include at least one page table entry that specifies a physical address in said primary physical memory for a corresponding virtual memory page.--

UNITED STATES PATENT AND TRADEMARK OFFICE
CERTIFICATE OF CORRECTION

PATENT NO. : B1 5,101,485
DATED : December 10, 1996
INVENTOR(S) : Frank L. Perazzoli, Jr.

It is certified that error appears in the above-identified patent and that said Letters Patent is hereby corrected as shown below:

Column 10,
Line 30, after "removal." delete the period and insert

--; and where at least subset of page table pages removed from said working set by said removing step include at least one page table entry that specifies a physical address in said primary physical memory for a corresponding virtual memory page.--

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,101,485 | Page 1 of 1 |
| APPLICATION NO. | : 07/373873 | |
| DATED | : March 31, 1992 | |
| INVENTOR(S) | : Frank L. Perazzoli, Jr. | |

It is certified that error appears in the above-identified patent and that said Letters Patent is hereby corrected as shown below:

IN THE CLAIMS

Column 11, Claim 11, line 27, delete "one" and insert therefor --none--

Signed and Sealed this

Twenty-first Day of August, 2007

JON W. DUDAS
*Director of the United States Patent and Trademark Office*

REEXAMINATION CERTIFICATE (3074th)

United States Patent [19]
Perazzoli, Jr.

[11] B1 5,101,485
[45] Certificate Issued Dec. 10, 1996

[54] VIRTUAL MEMORY PAGE TABLE PAGING APPARATUS AND METHOD

[76] Inventor: Frank L. Perazzoli, Jr., 5320 - 221st Ave. NE., Redmond, Wash. 98053

Reexamination Requests:
No. 90/003,444, May 26, 1994
No. 90/003,807, Apr. 17, 1995

Reexamination Certificate for:
Patent No.: 5,101,485
Issued: Mar. 31, 1992
Appl. No.: 373,873
Filed: Jun. 29, 1989

[51] Int. Cl.$^6$ ............... G06F 12/00; G06F 13/00; G06F 9/00
[52] U.S. Cl. ............... 395/416; 395/418; 395/650; 364/238.4; 364/243; 364/246; 364/246.11; 364/254; 364/254.3; 364/254.6; 364/256.3; 364/262.4; 364/262.9; 364/265; 364/265.3; 364/266.3; 364/266.6; 364/281.3; 364/281.7; 364/282.1; 364/DIG. 1
[58] Field of Search ............... 395/416, 418, 395/600

[56] References Cited

PUBLICATIONS

Kenah et al., "VAX/VMS Internals and Data Structures," Digital Equipment Corporation, Maynard, Mass., Order No. EY-8264E-DP, Chapters 14 and 15, 1987.
VAX/VMS Internals and Data Structures, Chapters 13 and 14, and Table of Contents (Apr. 1981).
VAX/VMS Internals and Data Structures, v4.4, Table of Contents (Dec. 1987).

*Primary Examiner*—Jack A. Lane

[57] ABSTRACT

A virtual memory nmanagement system and method in which the mechanism for selecting the pages to be swapped out of a process's working set takes into account special criteria for swapping out page table pages. When all the virtual memory pages referenced by a page table page are invalid, but some remain stored in primary memory, the page table page becomes eligible for removal from the process's working set. A page table page is made eligible for being swapped out to secondary memory only when every virtual memory page referenced by that page table page is invalid and no longer stored in primary memory.

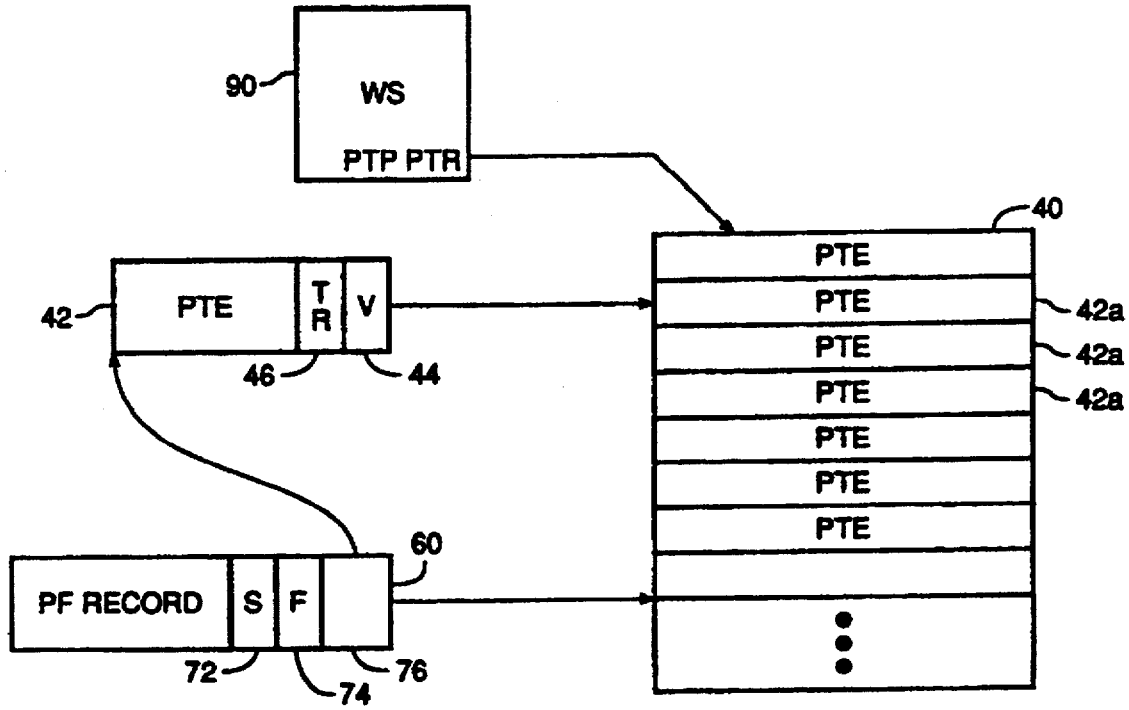

B1 5,101,485

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–13 are determined to be patentable as amended.

New claims 14–26 are added and determined to be patentable.

1. A virtual memory addressing means for a multitasking computer having a multiplicity of simultaneously active processes, the computer having primary and secondary physical memory for storing pages of memory associated with each of said active processes, each active process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for removing a page table page from said working set of said virtual memory pages when none of said page table entries in said page table page [correspond] *corresponds* to virtual memory pages in said working set of said virtual memory pages;

*wherein at least a subset of page table pages removed from said working set by said paging means include at least one page table entry that specifies a physical address in said primary physical memory for a corresponding virtual memory page.*

2. A virtual memory address means for a multitasking computer having a multiplicity of simultaneously active processes, the computer having primary and secondary physical memory for storing pages of memory associated with each of said processes, each process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for moving selected virtual memory pages of said active process to secondary physical memory and for removing selected pages from said working set of said virtual memory pages; said paging means denoting a page table page as being eligible for removal from said working set of said virtual memory pages when none of said page table entries in said page table page [correspond] *corresponds* to virtual memory pages in said working set;

*wherein at least a subset of page table pages removed from said working set by said paging means include at least one page table entry that specifies a physical address in said primary physical memory for a corresponding virtual memory page.*

3. The virtual memory addressing means set forth in claim 2, each page said page table entry including status means for denoting whether the corresponding virtual memory page is eligible for being moved from said primary to said secondary physical memory;

said paging means including means for denoting in a page table entry corresponding to a page table page that said page table page is eligible for being moved from said primary to said secondary physical memory when none of said page table entries in said page table page [correspond] *corresponds* to virtual memory pages stored in primary physical memory.

4. A virtual memory address means for a multitasking computer having a multiplicity of simultaneously active processes, the computer having primary and secondary physical memory for storing pages of memory associated with each of said processes, each process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for removing a page table page from said working set of said virtual memory pages when none of said page table entries in said page table page [correspond] *corresponds* to virtual memory pages in said working set; said paging means including means for storing said page table page in secondary physical memory when none of said page table entries in said page table page [correspond] *corresponds* to virtual memory pages stored in primary physical memory;

*wherein at least a subset of page table pages removed from said working set by said paging means include at least one page table entry that specifies a physical address in said primary physical memory for a corresponding virtual memory page.*

5. The virtual memory addressing means set forth in claim 4, each said page table entry including status means for denoting said status value for the corresponding virtual memory page, wherein said status means is assigned a distinct "valid" status value for virtual memory pages stored in primary physical memory and included in said working set, a distinct "invalid" status value for virtual memory pages stored in secondary physical memory, and a distinct "transition" status value for virtual memory pages stored in primary physical memory but not included in said working set;

said paging means including means for changing the status value denoted by a page table entry corresponding to a page table page to said "transition" status value when none of said page table entries in said page table page [correspond] *corresponds* to virtual memory pages in said working set.

6. A virtual memory management system for a multitasking computer having a multiplicity of simultaneously active processes, the computer having primary and secondary physical memory for storing pages of memory associated with each of said active processes, each active process having an associated set of virtual memory pages; said virtual memory management system comprising:

page table means for each active process, each said page table means denoting a status value for each virtual memory page associated with a corresponding one of said active processes; each said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for each active process, each said working set means denoting a working set of said virtual memory pages which are stored in primary physical memory for a corresponding one of said active processes, each said working set of said virtual memory pages including at least one of said page table pages; and paging means, coupled to said page table means and said working set means for each active process, for removing a page table page from said working set of said virtual memory pages associated with one of said active processes when none of said page table entries in said page table page [correspond] *corresponds* to virtual memory pages in said working set; said paging means including means for storing said page table page in secondary physical memory when none of said page table entries in said page table page [correspond] *corresponds* to virtual memory pages stored in primary physical memory;

*wherein at least a subset of page table pages removed from said working set by said paging means include at least one page table entry that specifies a physical address in said primary physical memory for a corresponding virtual memory page.*

7. The virtual memory management system set forth in claim 6, each said page table entry including status means for denoting said status value for the corresponding virtual memory page, wherein said status means is assigned a distinct "valid" status value for virtual memory pages stored in primary physical memory and included in said working set of said virtual memory pages, a distinct "[invlaid] *invalid*" status value for virtual memory pages stored in secondary physical memory, and a distinct "transition" status value for virtual memory pages in primary physical memory but not included in said working set of said virtual memory pages;

said paging means including means for changing the status value denoted by a page table entry corresponding to a page table page to said "transition" status value when none of said page table entries in said page table page [correspond] *corresponds* to virtual memory pages in said working set.

8. A virtual memory management method for a multitasking computer having a multiplicity of simultaneously active processes, the computer having primary and secondary physical memory for storing pages of memory associated with each of said processes, each process having an associated set of virtual memory pages, the steps of the method comprising:

providing a page table for each active process in said multitasking computer, each said page table denoting a status value for each virtual memory page associated with a corresponding one of said active processes; denoting in said page table a page table entry for each said virtual memory page specifying a physical address in said primary or secondary physical memory in accordance with where said virtual memory page is currently stored, said page table entries being stored in one or more page table pages;

denoting, for each active process, a working set of said virtual memory pages which are stored in primary physical memory; said working set of said virtual memory pages including at least one of said page table pages; and removing a page table page from said working set of said virtual memory pages when none of said page table entries in said page table page [correspond] *corresponds* to virtual memory pages in said working set;

*wherein at least subset of page table pages removed from said working set by said removing step includes at least one page table entry that specifies a physical address in said primary physical memory for a corresponding virtual memory page.*

9. The virtual memory management method of claim 8, further including the step of storing said page table page in secondary physical memory when none of said page table entries in said page table page [correspond] *corresponds* to virtual memory pages stored in primary physical memory.

10. The virtual memory management method of claim 8, each said page table entry denoting said status value for a corresponding virtual memory page, wherein said status value is set to a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages;

said method including changing the status value denoted by a page table entry corresponding to a page table page to said "transition" status value when none of said page table entries in said page table page [correspond] *corresponds* to virtual memory pages in said working set.

11. A virtual memory management method for a multitasking computer having a multiplicity of simultaneously active processes, the computer having primary and secondary physical memory for storing pages of memory associated with each of said processes, each process having an associated set of virtual memory pages, the steps of the method comprising:

providing a page table for each active process in said multitasking computer, each said page table denoting a status value for each virtual memory page associated with a corresponding one of said active processes; denoting in said page table a page table entry for each said virtual memory page specifying a physical address in said primary or secondary physical memory in accordance with where said virtual memory page is currently stored, said page table entries being stored in one or more page table pages;

denoting, for each active process, a working set of said virtual memory pages which are stored in primary physical memory; said working set of said virtual memory pages including at least one of said page table pages;

moving selected virtual memory pages of each said active process to secondary physical memory and removing selected pages from said working set of said virtual memory pages associated with each said active process; and denoting a page table page as being eligible for removal from a corresponding one of said working sets of said virtual memory pages when none of said page table entries in said page table page [correspond] *corresponds* to virtual memory pages in said working set;

*wherein at least subset of page table pages removed from said working set by said removing step include at least one page table entry that specifies a physical address in said primary physical memory for a corresponding virtual memory page.*

12. The virtual memory management method of claim 11, wherein:

each said page entry denotes whether a corresponding virtual memory page is eligible for being moved from said primary to said secondary physical memory; and said memory management method further includes the step of:

denoting in a page table entry corresponding to a page table page that said page table page is eligible for being moved from said primary to said secondary physical memory when none of said page table entries in said page table page [correspond] *corresponds* to virtual memory pages stored in primary physical memory.

13. The virtual memory management method of claim 11, wherein:

each said page entry denotes said status value for a corresponding virtual memory page, wherein said status value is set to a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages; and said memory management method includes the step of changing the status value denoted by a page table entry corresponding to a page table page to said "transition" status value when none of said page table entries in said page table page [correspond] *corresponds* to virtual memory pages in said working set.

*14. A virtual memory addressing means for a multitasking computer having a multiplicity of simultaneously active processes, the computer having primary and secondary physical memory for storing pages of memory associated with each of said active processes, each active process having an associated set of virtual memory pages; said virtual memory addressing means for each active process comprising:*

*page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;*

*working set means for denoting a working set of said virtual memory pages which are stored in primary physical memory, said working set of said virtual memory pages including at least one of said page table pages; and*

*paging means coupled to said page table means and said working set means for removing a page table page from said working set of said virtual memory pages, while leaving said page table entries in said page table page unchanged, when none of said page table entries in said page table page corresponds to virtual memory pages in said working set of said virtual memory pages.*

15. A virtual memory address means for a multitasking computer having a multiplicity of simultaneously active processes, the computer having primary and secondary physical memory for storing pages of memory associated with each of said processes, each process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for moving selected virtual memory pages of said active process to secondary physical memory and for removing selected pages from said working set of said virtual memory pages; said paging means denoting a page table page as being eligible for removal from said working set of said virtual memory pages, while leaving said page table entries in said page table page unchanged, when none of said page table entries in said page table page corresponds to virtual memory pages in said working set;

wherein said paging means leaves unchanged said page table entries in said page table page denoted as eligible for removal.

16. The virtual memory addressing means set forth in claim 15, each said page table entry including status means for denoting whether the corresponding virtual memory page is eligible for being moved from said primary to said secondary physical memory;

said paging means including means for denoting in a page table entry corresponding to a page table page that said page table page is eligible for being moved from said primary to said secondary physical memory when none of said page table entries in said page table page corresponds to virtual memory pages stored in primary physical memory.

17. A virtual memory address means for a multitasking computer having a multiplicity of simultaneously active processes, the computer having primary and secondary physical memory for storing pages of memory associated with each of said processes, each process having an associated set of virtual memory pages; said virtual memory addressing means for each active process comprising:

page table means for denoting a status value for each virtual memory page of said set of virtual memory pages associated with said active process; said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for denoting a working set of said virtual memory pages which are stored in primary physical memory, said working set of said virtual memory pages including at least one of said page table pages; and paging means coupled to said page table means and said working set means for removing a page table page from said working set of said virtual memory pages, while leaving said page table entries in said page table page unchanged, when none of said page table entries in said page table page corresponds to virtual memory pages in said working set; said paging means including means for storing said page table page in secondary physical memory when none of said page table entries in said page table page corresponds to virtual memory pages stored in primary physical memory.

18. The virtual memory addressing means set forth in claim 17, each said page table entry including status means for denoting said status value for the corresponding virtual memory page, wherein said status means is assigned a distinct "valid" status value for virtual memory pages stored in primary physical memory and included in said working set, a distinct "invalid" status value for virtual memory pages stored in secondary physical memory, and a distinct "transition" status value for virtual memory pages stored in primary physical memory but not included in said working set;

said paging means including means for changing the status value denoted by a page table entry corresponding to a page table page to said "transition" status value when none of said page table entries in said page table page corresponds to virtual memory pages in said working set.

19. A virtual memory management system for a multitasking computer having a multiplicity of simultaneously active processes, the computer having primary and secondary physical memory for storing pages of memory associated with each of said active processes, each active process having an associated set of virtual memory pages; said virtual memory management system comprising:

page table means for each active process, each said page table means denoting a status value for each virtual memory page associated with a corresponding one of said active processes; each said page table means including a page table entry corresponding to each said virtual memory page, each said page table entry specifying a physical address in said primary or secondary physical memory for said corresponding virtual memory page in accordance with where said corresponding virtual memory page is currently stored, said page table entries being stored in one or more page table pages;

working set means for each active process, each said working set means denoting a working set of said virtual memory pages which are stored in primary physical memory for a corresponding one of said active processes, each said working set of said virtual memory pages including at least one of said page table pages; and paging means, coupled to said page table means and said working set means for each active process, for removing a page table page from said working set of said virtual memory pages associated with one of said active processes, while leaving said page table entries in said page table page unchanged, when none of said page table entries in said page table page corresponds to virtual memory pages in said working set; said paging means including means for storing said page table page in secondary physical memory when none of said page table entries in said page table page corresponds to virtual memory pages stored in primary physical memory.

20. The virtual memory management system set forth in claim 19, each said page table entry including status means for denoting said status value for the corresponding virtual memory page, wherein said status means is assigned a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages;

said paging means including means for changing the status value denoted by a page table entry corresponding to a page table page to said "transition" status value when none of said page table entries in said page table page corresponds to virtual memory pages in said working set.

21. A virtual memory management method for a multitasking computer having a multiplicity of simultaneously active processes, the computer having primary and secondary physical memory for storing pages of memory associated with each of said processes, each process having an associated set of virtual memory pages, the steps of the method comprising:

providing a page table for each active process in said multitasking computer, each said page table denoting a status value for each virtual memory page associated with a corresponding one of said active processes; denoting in said page table a page table entry for each said virtual memory page specifying a physical address in said primary or secondary physical memory in accordance with where said virtual memory page is currently stored, said page table entries being stored in one or more page table pages;

denoting, for each active process, a working set of said virtual memory pages which are stored in primary physical memory; said working set of said virtual memory pages including at least one of said page table pages; and removing a page table page from said working set of said virtual memory pages, while leaving said page table entries in said page table page unchanged, when none of said page table entries in said page table page corresponds to virtual memory pages in said working set.

22. The virtual memory management method of claim 21, further including the step of storing said page table page in secondary physical memory when none of said page table entries in said page table page corresponds to virtual memory pages stored in primary physical memory.

23. The virtual memory management method of claim 21, each said page table entry denoting said status value for a corresponding virtual memory page, wherein said status value is set to a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages;

said method including changing the status value denoted by a page table entry corresponding to a page table page to said "transition" status value when none of said page table entries in said page table page corresponds to virtual memory pages in said working set.

24. A virtual memory management method for a multitasking computer having a multiplicity of simultaneously active processes, the computer having primary and secondary physical memory for storing pages of memory associated with each of said processes, each process having an associated set of virtual memory pages, the steps of the method comprising:

providing a page table for each active process in said multitasking computer, each said page table denoting a status value for each virtual memory page associated with a corresponding one of said active processes; denoting in said page table a page table entry for each said virtual memory page specifying a physical address in said primary or secondary physical memory in accordance with where said virtual memory page is currently stored, said page table entries being stored in one or more page table pages;

denoting, for each active process, a working set of said virtual memory pages which are stored in primary physical memory; said working set of said virtual memory pages including at least one of said page table pages;

moving selected virtual memory pages of each said active process to secondary physical memory and removing selected pages from said working set of said virtual memory pages associated with each said active process; and denoting a page table page as being eligible for removal from a corresponding one of said working sets of said virtual memory pages, while leaving said page table entries in said page table page unchanged, when none of said page table entries in said page table page corresponds to virtual memory pages in said working set;

wherein said denoting step and removing step both leave unchanged said page table entries in said page table page denoted as eligible for removal.

25. The virtual memory management method of claim 24, wherein:

each said page table entry denotes whether a corresponding virtual memory page is eligible for being moved from said primary to said secondary physical memory; and said memory management method further includes the step of:

denoting in a page table entry corresponding to a page table page that said page table page is eligible for being moved from said primary to said secondary physical memory when none of said page table entries in said page table page corresponds to virtual memory pages stored in primary physical memory.

26. The virtual memory management method of claim 24, wherein:

each said page table entry denotes said status value for a corresponding virtual memory page, wherein said status value is set to a distinct "valid" status value for virtual memory pages stored in primary physical memory and included in said working set of said virtual memory pages, a distinct "invalid" status value for virtual memory pages stored in secondary physical memory, and a distinct "transition" status value for virtual memory pages stored in primary physical memory but not included in said working set of said virtual memory pages; and said memory management method includes the step of changing the status value denoted by a page table entry corresponding to a page table page to said "transition" status value when none of said page table entries in said page table page corresponds to virtual memory pages in said working set.

* * * * *